US009500526B2

(12) United States Patent
Lee

(10) Patent No.: US 9,500,526 B2
(45) Date of Patent: Nov. 22, 2016

(54) HIGH-THROUGHPUT AND HIGH RESOLUTION METHOD FOR MEASURING THE COLOR UNIFORMITY OF A LIGHT SPOT

(71) Applicant: DiCon Fiberoptics Inc., Richmond, CA (US)

(72) Inventor: Jeffrey Lee, El Sobrante, CA (US)

(73) Assignee: DiCon Fiberoptics Inc., Richmond, CA (US)

( * ) Notice: Subject to any disclaimer, the term of this patent is extended or adjusted under 35 U.S.C. 154(b) by 711 days.

(21) Appl. No.: 13/802,134

(22) Filed: Mar. 13, 2013

(65) Prior Publication Data

US 2014/0218511 A1 Aug. 7, 2014

Related U.S. Application Data

(60) Provisional application No. 61/759,807, filed on Feb. 1, 2013.

(51) Int. Cl.
*G01J 3/50* (2006.01)
*G01J 3/46* (2006.01)

(52) U.S. Cl.
CPC .......... *G01J 3/505* (2013.01); *G01J 2003/466* (2013.01)

(58) Field of Classification Search
CPC ..... H04N 9/04; G01J 3/505; G01J 2003/466
USPC .................. 348/135, 222.1, 208.1; 356/406; 250/559.22; 345/419; 375/240.13, 375/240.16
See application file for complete search history.

(56) References Cited

U.S. PATENT DOCUMENTS

| | | | |
|---|---|---|---|
| 6,600,168 B1 * | 7/2003 | Geng | 250/559.22 |
| 2002/0007122 A1 * | 1/2002 | Kaufman | A61B 1/00009 600/476 |
| 2003/0058238 A1 * | 3/2003 | Doak et al. | 345/419 |
| 2004/0263848 A1 * | 12/2004 | Chen et al. | 356/406 |
| 2005/0046702 A1 * | 3/2005 | Katayama et al. | 348/222.1 |
| 2005/0232356 A1 * | 10/2005 | Gomi et al. | 375/240.16 |
| 2005/0273011 A1 * | 12/2005 | Hattery | A61B 5/0059 600/476 |
| 2007/0063997 A1 * | 3/2007 | Scherer et al. | 345/419 |

(Continued)

Primary Examiner — James Pontius
(74) Attorney, Agent, or Firm — Davis Wright Tremaine LLP

(57) ABSTRACT

The color uniformity of a light spot is measured by providing an image of the light spot by means of a camera or camera sensor with sensor elements, each of the sensor elements capturing a set of three or more color component values that together define a set of pixel values at such sensor element, wherein the image includes a plurality of sets of pixel values. The method also derives for each of the plurality of sets of pixel values at a corresponding sensor element a first ratio between a first pair of the pixel values or of values obtained therefrom in such set. Preferably a second ratio is also derived between a second pair of the pixel values or of values obtained therefrom in such set, where the second pair is different from the first pair. Where the sensor elements used each provides a single intensity value instead of multiple pixel values of different colors, light is projected onto a spot of the camera or camera sensor along an optical path with a different one of three or more different color filters sequentially in the path. For each sensor element a first ratio is derived between a first pair of the intensity values of different colors provided by such sensor element or of values obtained therefrom and preferably also a second ratio is derived between a second pair of the intensity values of different colors or of values obtained therefrom provided by such sensor element different from the first pair.

8 Claims, 6 Drawing Sheets

(56) References Cited

U.S. PATENT DOCUMENTS

2007/0161910 A1* 7/2007 Preece .................. A61B 5/443
                                                            600/476
2008/0136923 A1* 6/2008 Inbar et al. ................ 348/208.2
2008/0267290 A1* 10/2008 Barbieri et al. ......... 375/240.13
2009/0021588 A1* 1/2009 Border et al. ............. 348/208.1

* cited by examiner

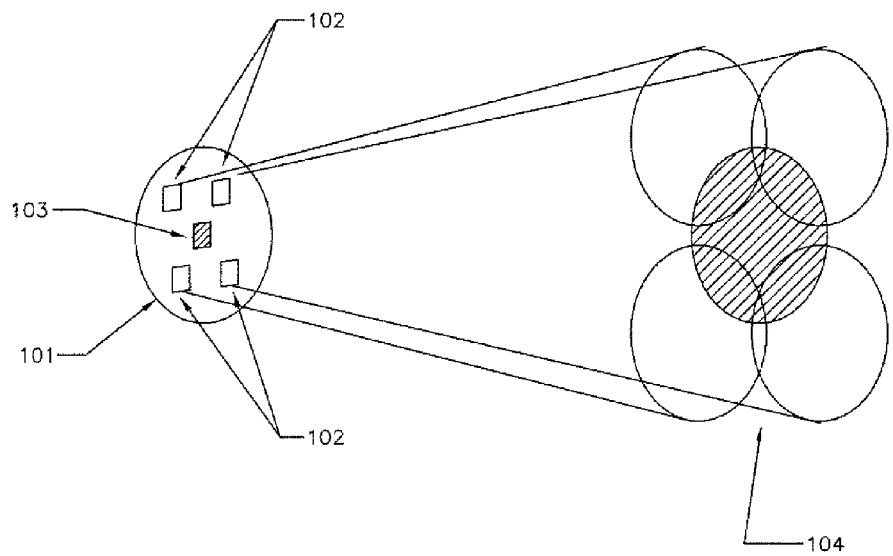
FIG. 1 — PRIOR ART
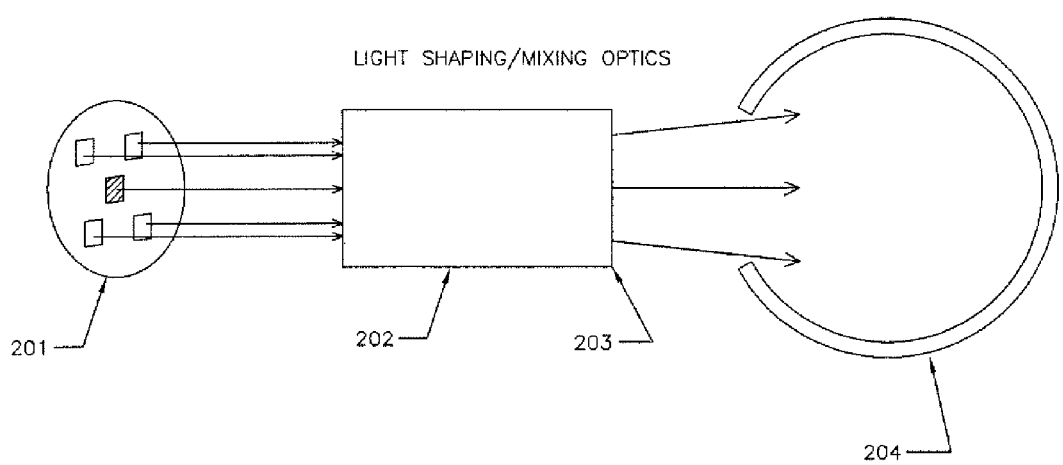
FIG. 2 — PRIOR ART

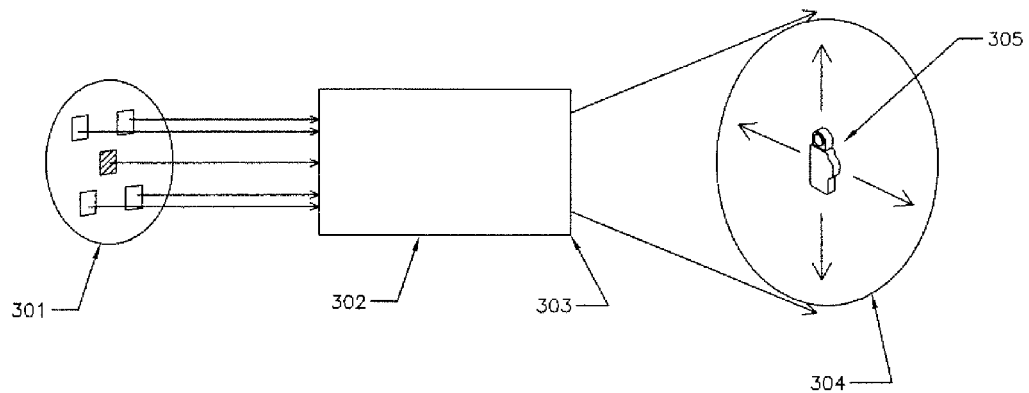
FIG. 3 — PRIOR ART
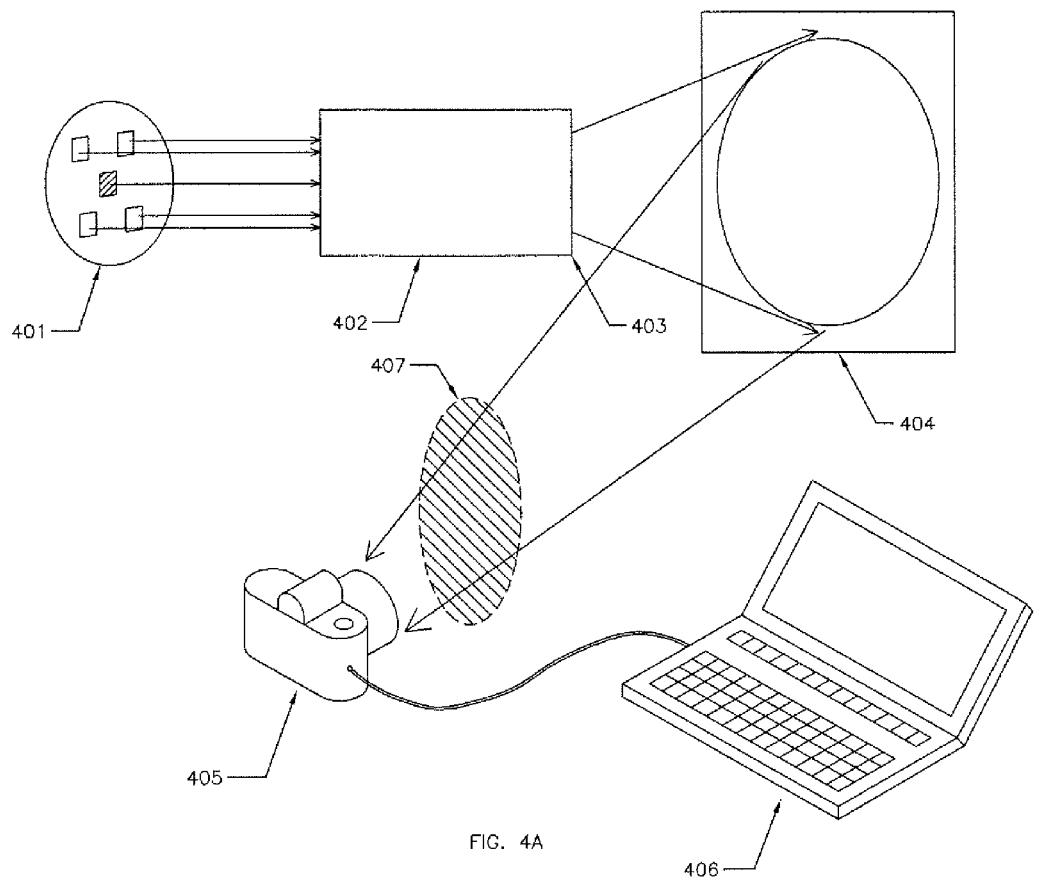
FIG. 4A

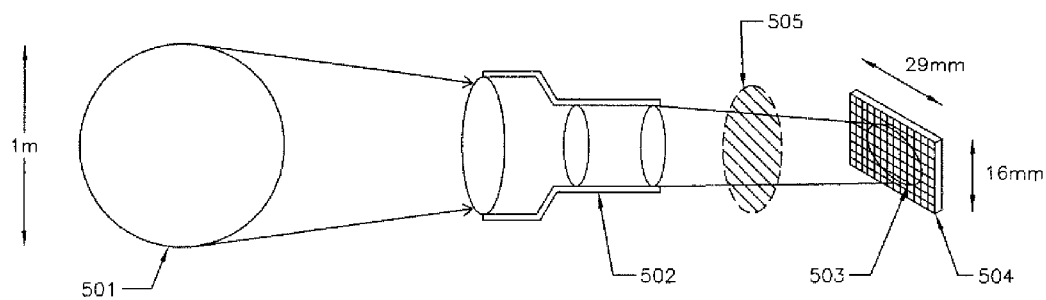
FIG. 5
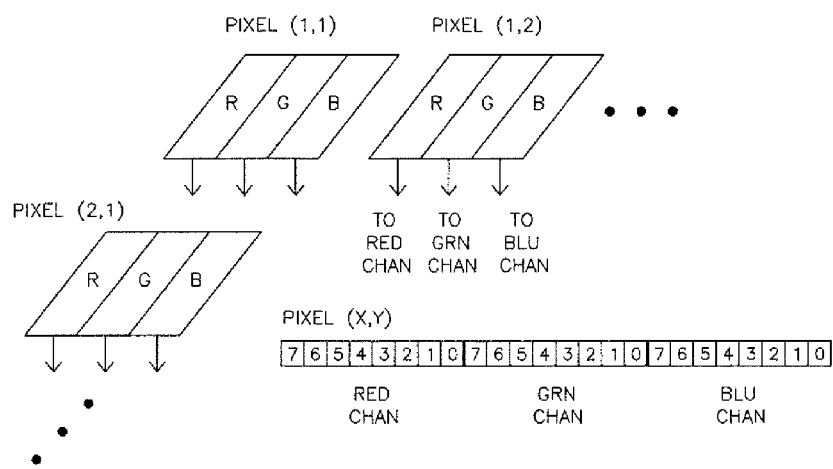
FIG. 6 — PRIOR ART

HIGH-THROUGHPUT AND HIGH RESOLUTION METHOD FOR MEASURING THE COLOR UNIFORMITY OF A LIGHT SPOT

CROSS-REFERENCE TO RELATED APPLICATION

This application claims the benefit of U.S. Provisional Application No. 61/759,807 filed Feb. 1, 2013, which application is incorporated herein by its entirety.

BACKGROUND

This invention relates to the method of measuring and characterizing the spatial distribution of color across a light spot created from a lighting apparatus, and in particular to the measurement and characterization of light spots with high color uniformity, created from Light Emitting Diode sources and subsequent light shaping and mixing optics.

Colored (non-monochromatic) lights have been used in numerous applications such as cinematography, photography, and architectural lighting (both commercial/industrial and residential). A high quality light spot created from a light source is characterized by its spatially uniform chromaticity, or color temperature when characterizing white light. Achieving a spatially uniform light spot has not been challenging to do with traditional light sources such as tungsten bulbs and HMI (hydrargyrum medium-arc iodide) lamps since it is easier to produce a uniform light spot from a uniform source rather than a non-uniform one. However, producing a uniform light spot is more of a challenge for some modern light sources that rely on the mixing of light from multiple discrete light sources such as LEDs (Light Emitting Diodes), which typically require additional light shaping and/or mixing optics such as diffusers to achieve good color uniformity. Although there are LED based light sources which are similar to traditional light sources in that the individual LED chips all emit the same color and hence make up a uniform source, many LED light sources are composed of multiple discrete LEDs, or an array of LED chips, of two or more different colors. As example, in FIG. 1 an LED array light source (101) is composed of chips of two colors (102, 103) and without spatial light mixing optics the non-uniform colored light source produces a non-uniform colored light spot (104).

Because color uniformity across the light spot is so important, there is a need to measure it both in research and development, as well as in production and in product use. Light measurement integrating spheres can be used to measure the chromaticity of the total light coming from an LED array but they do not indicate or measure the spatial distribution of the chromaticity of the light. Furthermore, although an integrating sphere can measure the intensities of different colors, it does not measure the sharpness or gradient of the transition between colors across the light spot. For instance, a spot having a blue region that gradually transitions to a red region looks different from one where the transition is sharp or abrupt, creating an easily visible edge.

The desired detailed spatial color distribution can be measured by smaller light detectors such as colorimeters which can measure chromaticity at different regions as the detector is physically moved to different locations on the light spot. The primary disadvantage of using a traditional colorimeter and moving it to different positions on a light spot is that the measurements must be done serially, one after another, and hence take significant time if good spatial resolution is to be achieved. Furthermore, the size of commercially available colorimeters or detectors is typically on the order of a square inch which may be comparable to, or of the same order of magnitude as, the size of the light spot being measured, thereby limiting the maximum spatial resolution.

It is therefore desirable to provide an improved method of measuring and characterizing the spatial distribution of color across a light spot created from non-uniform light sources, such as Light Emitting Diodes.

SUMMARY OF THE INVENTION

One embodiment is directed to a method for measuring the color uniformity of a light spot, which comprises providing an image of the light spot by means of a camera or camera sensor with sensor elements, each of the sensor elements capturing a set of three or more color component values that together define a set of pixel values at such sensor element, wherein the image includes a plurality of sets of pixel values. The method also derives for each of the plurality of sets of pixel values at a corresponding sensor element a first ratio between a first pair of the color component values or of values obtained therefrom in such set and a second ratio between a second pair of the color component values or of values obtained therefrom in such set, the second pair being different from the first pair in such set.

Another embodiment is directed to an apparatus for measuring the color uniformity of a light spot, comprising a camera sensor with sensor elements obtaining an image of the light spot, each of the sensor elements capturing a set of three or more color component values that together define a set of pixel values at such sensor element, wherein the image includes a plurality of sets of pixel values; and means for deriving for each of the plurality of sets of pixel values at a corresponding sensor element a first ratio between a first pair of the color component values or of values obtained therefrom in such set and a second ratio between a second pair of the color component values or of values obtained therefrom in such set, the second pair being different from the first pair in such set.

Yet another embodiment is directed to a method for measuring the color uniformity of a light spot, comprising obtaining an image of the light spot by means of a camera or camera sensor with sensor elements, each of the sensor elements capturing a set of multiple color component values that together define a set of pixel values at such sensor element, wherein the image includes a plurality of sets of pixel values; and deriving for each of the plurality of sets of pixel values at a corresponding sensor element a ratio between a pair of the color component values or of values obtained therefrom in such set.

One more embodiment is directed to a method for measuring the color uniformity of a light spot, comprising projecting light along an optical path onto a spot of a camera or camera sensor with sensor elements, causing each of the sensor elements to output an intensity value, wherein the projecting is performed sequentially with a different one of three or more different color filters in the optical path, causing each of the sensor elements to provide sequentially intensity values of three or more different colors at the spot. The method also includes deriving for each sensor element a first ratio between a first pair of the intensity values of different colors provided by such sensor element or of values obtained therefrom and a second ratio between a second pair of the intensity values of different colors or of values obtained therefrom provided by such sensor element different from the first pair.

Still another embodiment is directed to an apparatus for measuring the color uniformity of a light spot, comprising a camera or camera sensor with sensor elements; means for projecting light along an optical path onto a spot of the camera or camera sensor, each of the sensor elements outputting an intensity value; and three or more different color filters. The apparatus also includes means for causing each one of the three or more different color filters to be in the optical path sequentially when light is projected onto a spot of the camera or camera sensor, so that each of the sensor elements outputs sequentially three or more intensity values of different colors; and means for deriving for each sensor element a first ratio between a first pair of the intensity values of different colors or of values obtained therefrom provided by such sensor element and a second ratio between a second pair of the intensity values of different colors or of values obtained therefrom provided by such sensor element different from the first pair.

All patents, patent applications, articles, books, specifications, other publications, documents and things referenced herein are hereby incorporated herein by this reference in their entirety for all purposes. To the extent of any inconsistency or conflict in the definition or use of a term between any of the incorporated publications, documents or things and the text of the present document, the definition or use of the term in the present document shall prevail.

BRIEF DESCRIPTION OF THE DRAWINGS

FIG. 1 is a representation of a prior art LED array light source comprised of LED chips of two colors, and the light spot created by it.

FIG. 2 is a representation of a prior art color measuring apparatus that uses an integrating light sphere.

FIG. 3 is a representation of a prior art color measuring apparatus that uses a compact colorimeter or light meter.

FIGS. 4A and 4B are representations of two embodiments of the present invention.

FIG. 5 is a representation of another embodiment of the present invention and illustrates a light spot being imaged by a lens, directly onto a camera sensor.

FIG. 6 is a representation of a prior art color camera sensor.

Identical components are labeled by the same numerals in this document.

DETAILED DESCRIPTIONS OF THE PREFERRED EMBODIMENTS

Figure 4B:
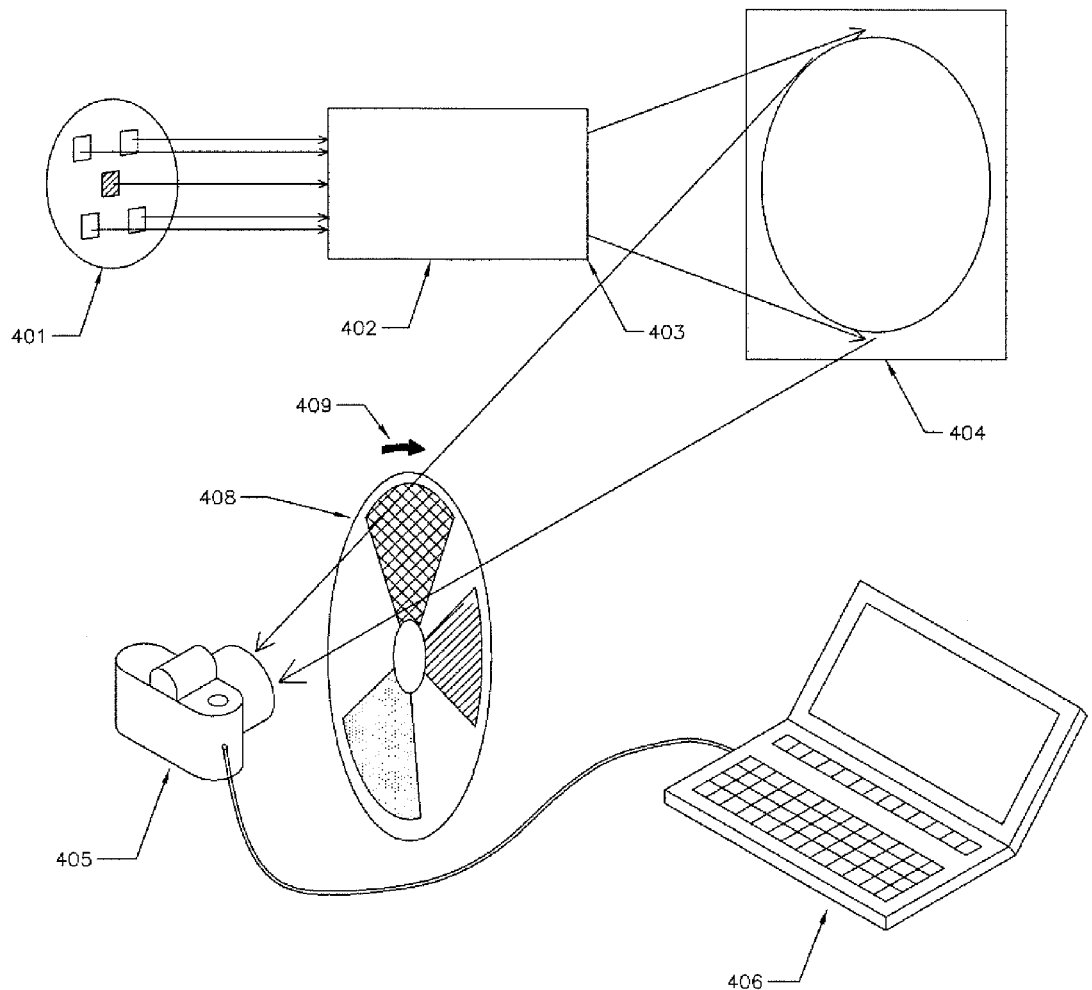

The invention achieves high throughput and high resolution by utilizing the resolution and pixel bit-depth of commercially available color-sensing CCD and CMOS cameras. An image of the light spot produced by a colored light source is projected onto a screen, imaged by a camera, and analyzed on a computer. The image file produced by said camera typically consists of a Red intensity (or brightness) value, a Green intensity value, and a Blue intensity value, for each pixel of the image, typically using 8 bits for each color component, or channel. The color distribution is quantified by measuring the intensity in the multiple (e.g. Red, Green, and Blue) channels for each pixel and comparing the relative ratios of pairs of the three color component values for different pixels. Furthermore, the correlated color temperature (CCT) can also be calculated from the three (or more) color channels, if so desired. For different locations in space that have the same color or CCT, the ratios of the multiple colors (for example, Red to Green, Red to Blue, and Green to Blue), will be the same. For a typical camera sensor that uses 8-bit values to represent each color, for instance, the Red/Green color ratio can be calculated for a pixel by taking the measured 8-bit intensity in the red channel and dividing it by the 8-bit intensity in the green channel. So long as the sensitivity of the three color channels in the camera sensor are linearly dependent on intensity, two pixels on the camera that image two different locations in space with the same color will therefore also have the same color ratio(s), independent of the total intensity at those locations.

The embodiments of the present invention quantify the spatial color distribution by examining the uniformity of the color ratio(s) across the image of a light spot. Human eyes are well adapted at seeing contrast, the gradients or rates of change of intensity and/or color over space, and therefore in addition to measuring the total range of color ratios, the gradient of the color ratios should be measured as well. A 10% change in color ratio from one extreme edge of a light spot to the other may be imperceptible but a 10% change over just 10% of the distance may be easily perceptible. Acceptability and even perceptibility of the color uniformity may vary for different observers, and so the present invention provides a method or metric for objectively quantifying it.

In most cases, the quality of the color uniformity matters only where the light spot illuminates a subject some distance away, regardless of what the color uniformity is within the lighting apparatus or at some other distance. Measurements should therefore be made of the light spot at distances where it will ultimately be used. FIG. 2 shows a representation of the prior art in color uniformity measurement methods, in which an integrating light sphere (204) is used to accurately measure the intensities or brightness of the different color components of the light (203) that is immediately exiting the lighting apparatus (comprising an LED array (201) and light shaping/mixing optics (202)). This method, however, does not reveal what the spatial distribution of these color components will be in the light spot. It is also limited by the need to have the lighting apparatus located close to the integrating sphere, typically adjacent to the sphere, or even inside of the sphere.

FIG. 3 shows another representation of the prior art in color uniformity measurement methods, in which a commercially available handheld light meter (305) is used to measure the color uniformity of the light spot (304). By translating or moving the light meter and measuring the chromaticity at different locations, the chromaticity at different points within the light spot can gradually be mapped out. Light meters, though typically less accurate than light spheres at measuring chromaticity and CCT, do give sufficiently accurate readings for most lighting applications such as architectural lighting and photography. The method, however, is limited by time since multiple measurements must be done serially. Furthermore, it requires a precise positioning system such as a translational stage in order to produce an accurate map of color distribution along the light spot. The finite size of the light detector, typically on the order of a square inch, also limits the spatial resolution of the measurement.

The present invention provides a high-throughput and high-resolution alternative to the light meter method. In the embodiments shown in FIGS. 4A and 4B, a camera (405) with a built-in sensor and lens images the light spot, as the light spot is projected onto a white or reflective surface (404). Today's commercially-available cameras typically use CCD or CMOS sensors. However, the present invention does not depend on the choice of camera sensor technology. The image file produced by the camera is then transferred to a computer (406) where it is analyzed. If the light is projected perpendicular to a flat surface, the measured spatial color distribution is independent of the camera's angle to the surface. Lenses of different focal length can be used to change magnification such that the image of the light spot covers most or all of the area of the camera's sensor, without having to physically move the camera.

Typical cameras utilize sensors that detect light at three different colors, typically Red, Green, and Blue. However, as described in more detail below, the embodiments of the present invention shown in FIGS. 4A and 4B do not depend on a multi-color camera or camera sensor. A monochromatic camera or camera sensor may also be used, by adding a color filter (407) to the embodiment shown in FIG. 4A, located in the optical path between the light source 401 and the camera 405. By using three (or more) different color filters, and taking a separate image using each one of the three (or more) color filters at each one of the three (or more) sequential imaging sessions, the multiple resulting image files obtained sequentially from the multiple sequential imaging sessions can be transferred to the computer for analysis. In this scenario it will be important for the camera and beam spot to remain fixed in position, as the multiple color filters and multiple images are taken. Each of the multiple resulting image files will contain intensity values outputted by sensor elements in response to the light that passed through a corresponding color filter, where the intensity values indicate the intensities of light at the color of the color filter used in the imaging session. The multiple image files so obtained will contain the corresponding physical location information of the sensor elements where the intensity values are obtained. The three (or more) color filters may also be placed on a rotating wheel which is rotated by a motor (not shown) controlled by an electronic controller (not shown), so that one of the filters is placed in the optical path at any one time during a corresponding imaging session, as shown in the alternative embodiment shown in FIG. 4B. In FIG. 4B, the filter wheel (408) provides three filter colors, and can be rotated (409) so that the multiple image files may be obtained sequentially. Although not shown in the figure, an electronic controller can be used to control or automate the rotation of the color filter wheel, and to coordinate the rotation of the color filter wheel with the taking of images by the camera (407). While the filter and filter wheel are placed in the portion of the optical path between the spot 404 and camera 405 in FIG. 4B, they can instead be placed in any location in the portion of the optical path between the spot 404 and source 401. Ways other than a filter wheel for sequentially placing each of the three or more filters in the optical path may also be used, such as a linear filter array of three or more filters moved by a motor controlled by a controller along a straight line to place each of the filters sequentially in the optical path. The three or more filters may even be sequentially and manually placed in the optical path between the light source 401 and the camera 405.

FIG. 5 shows another embodiment of the present invention in which a light spot (501) is imaged by a lens system (502) to form a much smaller spot image (503), directly onto a commercially-available camera sensor (504). An optional color filter (505) selected from three (or more) color filters, optionally placed on a rotatable wheel (not shown) may also be used in the optical path between source 501 and spot 503, if a monochromatic camera sensor is used in this embodiment. The different implementations described above in reference to FIG. 4B regarding the location of the filters in the optical path, and for placing the three (or more) color filters sequentially in the optical path, are also applicable in the embodiment of FIG. 5.

Furthermore, in the embodiments shown in FIGS. 4A, 4B, and 5, the camera (or camera sensor) can be positioned to see exactly what an observer, such as an audience member, would see when the lighting apparatus is used, such as in a motion picture, television, or theatrical production. The throughput, flexibility, and resolution of the present invention qualify it as a feasible and improved alternative to the prior art for measuring color uniformity.

The millions of individual pixels in modern digital camera sensors act as millions of miniature light meters. The image of the light spot can span millions of pixels resulting in a high spatial resolution, yet acquisition time is still fast since the pixels are measured in parallel during one camera exposure. In contrast, making a color map from 100 different locations with a handheld light meter would take 100 positional translations and 100 exposures, with far lower spatial resolution. The amount of time needed to create a color map of a light spot using a handheld light meter scales with the number of positions, but is constant with the present invention. Although the sensors within commercially available cameras may not directly measure chromaticity as accurately as some precision light meters, their ability to measure the relative ratio of the intensity of just three colors is sufficient to characterize the color uniformity of a light spot. Thus the purpose of the present invention is to measure and characterize color uniformity, not absolute chromaticity, though approximate and reasonably accurate measurements of absolute chromaticity can still be made.

Typical camera sensors read or detect the chromaticity or color of the incident light as three separate components: usually Red, Green, and Blue (RGB), which are represented by the Red, Green, and Blue channels, respectively. Although camera sensors that detect Red, Green, and Blue will be assumed for much of the ensuing description, the present invention does not depend on, and is not limited by, the choices of colors for the camera sensor. The use of camera sensors that use differing colors, or that use other colors in addition to Red, Green, and Blue, is within the scope of the present invention. As just one example, a camera sensor that used Red, Green, and Blue, plus Yellow, Cyan, and Magenta, is within the scope of the present invention. As described above, it is also possible, and within the scope of the present invention, to use a monochromatic camera or camera sensor, in which a single intensity value is sensed at each pixel location (analogous to the use of black and white film in a film camera). In this case, external color filters would be used with the camera, to create multiple separate image files, each with a different color filter.

Assuming a typical commercially-available camera with a Red, Green, and Blue camera sensor, each pixel on the sensor has three channels that tell us how much Red, Green, and Blue light is striking that pixel. FIG. 6 illustrates in conceptual form such a typical prior art color camera sensor. Each pixel is identified by its (row, column) position and is split into 3 regions that detect the intensity of different colors and send the signal to their respective channels. FIG. 6 shows three representative pixels, from (x,y) locations (1,1), (1,2), and (2,1), out of the millions of pixels that are captured by a typical camera sensor. Also as shown in FIG. 6, each pixel (x,y) is represented in a digital image file by a digital value, representing the measured intensity of the Red, Green, and Blue components of the light that is incident on that pixel location. Typical commercially-available cameras use an 8-bit byte for each of the Red, Green, and Blue color component values, with decimal values ranging from 0 to 255. Thus, a 24-bit pixel value represents or is defined by a set of the three color component values, and a ratio between any pair of the 8 bit color component values in each set of pixel values provides a color ratio between the pair of corresponding colors. Note that the present invention does not depend on the specific digital image file format used, nor on the number of bits used to represent the multiple color component values within each pixel. The use of different image file formats, and different representations of pixels, even to the extent of using analog values or representations for the pixels, is within the scope of the present invention.

Since color can be characterized by the relative intensities of the color component values, such as Red, Green, and Blue, from which it is composed, two regions (or two distinct pixels) with the same color must have the same relative intensities of the color component values and hence in this example the ratio of intensities Red/Green, Red/Blue, and Green/Blue must be constant over the two regions, regardless of total intensity. A light spot thus has uniform color if and only if the color ratios are uniform over the effective surface area of the light spot. Once the light spot is imaged, the color ratios can be easily computed from the image file, and the color uniformity characterized.

Figure 7:
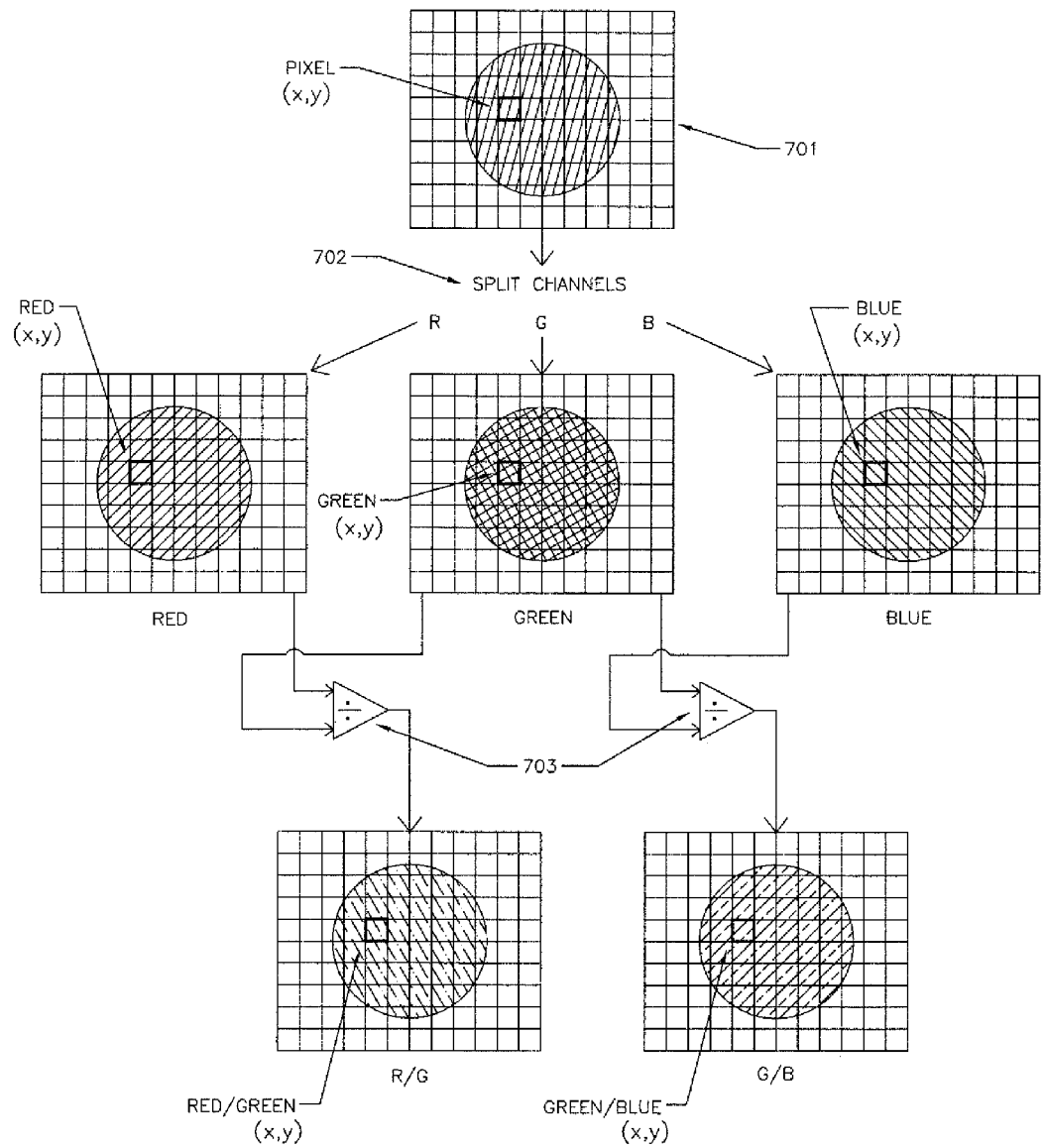
FIG. 7 is a representation of one embodiment of the present invention, symbolically depicting the algorithm.

FIG. 7 represents one embodiment of an algorithm or method that may be used in some of the embodiments of the present invention, to obtain a spatial distribution map of the color ratios from the image. The camera sensor (701) splits the image into the three color channels or color components (e.g. of 8 bits each): Red, Green, Blue (702), for each of the pixels of the image. The channels can be divided, sensor element-by- sensor element, or pixel-by-pixel (703), to obtain "topographic" or "isotherm"-style intensity maps of the Red/Green (R/G) and Green/Blue (G/B) color ratios. (Once the R/G and G/B color ratios are determined, it is not necessary to also calculate the corresponding Red/Blue (R/B) color ratio. Any two of the color ratios serve to define the third ratio.) This algorithm is fast to compute and easy to implement on most computers. Using the intensity map, it is then possible to objectively quantify, and also visualize, important attributes such as color uniformity, color contrast and color gradients. While preferably two of the three ratios Red/Green, Red/Blue, and Green/Blue are computed, in some applications, computation of only one ratio may be adequate, in which ease only one of the three ratios Red/Green, Red/Blue, and Green/Blue is computed.

FIG. 7 depicts just one of the possible algorithms or methods that are within the scope of the present invention. Calculating the simple ratios of the multiple color component values of each pixel, as described above, provides a quick and convenient way to quantitatively analyze color uniformity, color contrast, and color gradients. However, other calculations may be better suited to the specific situation. Examples include: calculation of the ratio of the squares of the color values, calculation of the ratio of the natural logarithms (or different base logarithms) of the color component values, or calculation of the ratio of the absolute values of the differences between the measured color component values and a mean or average color component value. In these examples, the squares or logarithms of the color component values are first obtained before the ratios of these quantities are derived. These, and other alternative algorithms or methods are within the scope of the present invention.

Where the camera or camera sensor is monochromatic and is used in conjunction with a set of three or more color filters as described above in reference to FIGS. 4A, 4B, and 5, the data flow in FIG. 7 will need to be modified slightly. Instead of splitting the three pixel values from each sensor element at location (x, y) along three channels of red, green and blue pixel values as in data flow 702, the red, green and blue intensity values from each sensor element at location (x, y) will be ones acquired independently from one another by such sensor element and acquired sequentially using red, green and blue filters as described above in reference to FIGS. 4A, 4B, and 5. Other than such modification, the method of FIG. 7 may be applied to the embodiment using monochromatic camera or camera sensor.

Figure 8A:
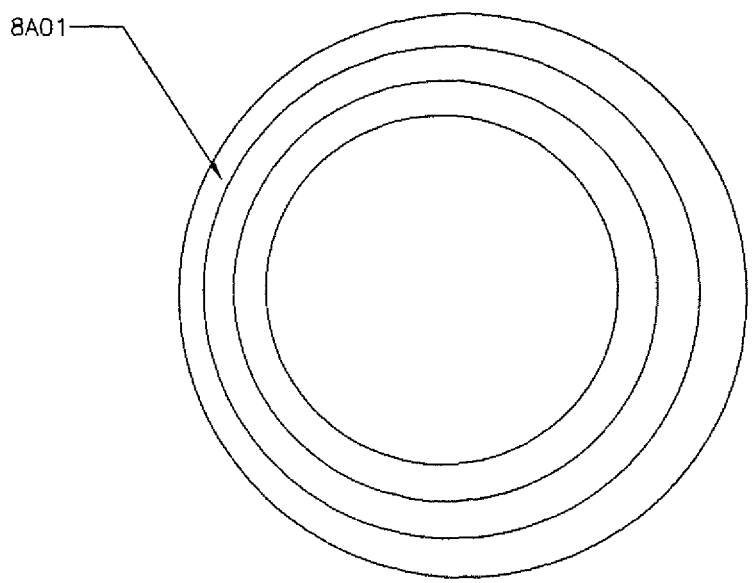
FIGS. 8A and 8B are representations of two different light spots with different color uniformity distributions.
Figure 8B:
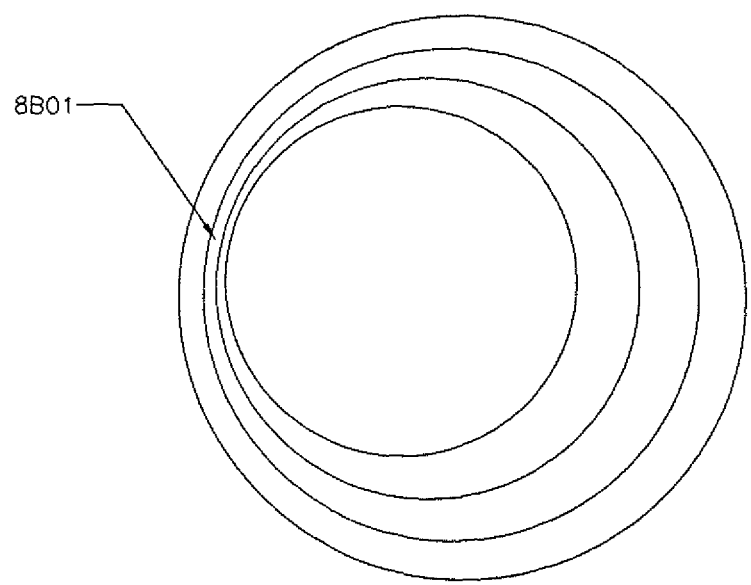

The human eye is well adapted at detecting contrast, thus a light spot has uniform color only if the range of color ratios and the gradient of the color ratios everywhere along the light spot are small. Knowing just the range of color ratios is insufficient for characterizing uniformity since a gradual change in color looks different from a sudden change in color along a light spot. Intensity maps of the color ratio values make it easy to visualize these gradients. FIGS. 8A and 8B illustrate one embodiment of a color ratio intensity map, in the form of a contour graph of color ratio for two different light spots. Each closed curve represents a different value for the color ratio and although both have the same range of color ratio, their gradients are different. This form of color contour graph is similar to the elevation contour lines used in topographical maps, in which closely-spaced lines indicate steep slopes or hilly terrain, and widely-spaced lines indicate relatively flat terrain. It is clear from these contour graphs of color ratio that the maximum color gradient (at location 8B01) in FIG. 8B is much greater than the maximum color gradient (at location 8A01) in 8A. The color contour graph gives a clear visual representation of the quantitative color ratio data provided by the measurement method of the present invention. Other algorithms or methods of quantifying the rate of change of the color ratios are also within the scope of the present invention, such as computing the amount of variation or difference that exists in the color ratios, when looking across all of the neighboring pixels that are within a defined distance from the pixel location in question.

The invention claimed is:

1. A method for measuring the color uniformity of a light spot, comprising:
   providing an image of the light spot by a camera or camera sensor with sensor elements, each of the sensor elements capturing a set of three or more color component values that together define a set of pixel values at said each sensor element, wherein the image includes a plurality of sets of pixel values;
   deriving for each of the plurality of sets of pixel values at a corresponding sensor element a first ratio between a first pair of the color component values or of values obtained therefrom in said each set and a second ratio between a second pair of the color component values or of values obtained therefrom in such set, said second pair being different from the first pair in such set, wherein said providing includes projecting light from a light source onto the light spot on a white surface and imaging said light spot onto said camera sensor; and computing by means of a mathematical relationship said values obtained from the first ratio between the first pair of the color component values in each set of pixel values at a corresponding sensor element prior to the deriving, said mathematical relationship including squares of the color component values, logarithms of the color component values, or differences between the color component values and a mean or average color component value.

2. The method of claim 1, further comprising;
providing a graphical plot of said first and second ratios at locations of the corresponding sensor element across the light spot.

3. The method of claim 1, wherein said deriving is performed by a computer.

4. The method of claim 1, wherein said providing includes projecting light from a light source onto the light spot on a plane.

5. The method of claim 1, wherein said projecting is performed by an optical element.

6. The method of claim 1, wherein said deriving for each set of pixel values derives one or more additional ratios between one or more additional pairs of the pixel values or of values obtained therefrom in said each set different from the first and second pairs in such set.

7. A method for measuring the color uniformity of a light spot, comprising:
providing an image of the light spot by a camera or camera sensor with sensor elements, each of the sensor elements capturing a set of three or more color component values that together define a set of pixel values at said each sensor element, wherein the image includes a plurality of sets of pixel values; and
deriving for each of the plurality of sets of pixel values at a corresponding sensor element a first ratio between a first pair of the color component values or of values obtained therefrom in such set and a second ratio between a second pair of the color component values or of values obtained therefrom in said each set, said second pair being different from the first pair in such set,
wherein said providing includes projecting light from a light source directly onto said camera sensor.

8. An apparatus for measuring the color uniformity of a light spot, comprising
a camera sensor with sensor elements obtaining an image of the light spot, each of the sensor elements capturing a set of three or more color component values that together define a set of pixel values at said each sensor element, wherein the image includes a plurality of sets of pixel values
a computer configured to derive for each of the plurality of sets of pixel values at a corresponding sensor element a first ratio between a first pair of the color component values or of values obtained therefrom in said each set and a second ratio between a second pair of the color component values or of values obtained therefrom in such set, said second pair being different from the first pair in such set; and
an optical device projecting light from a light source directly onto said camera sensor.

* * * * *